Patented Nov. 15, 1938

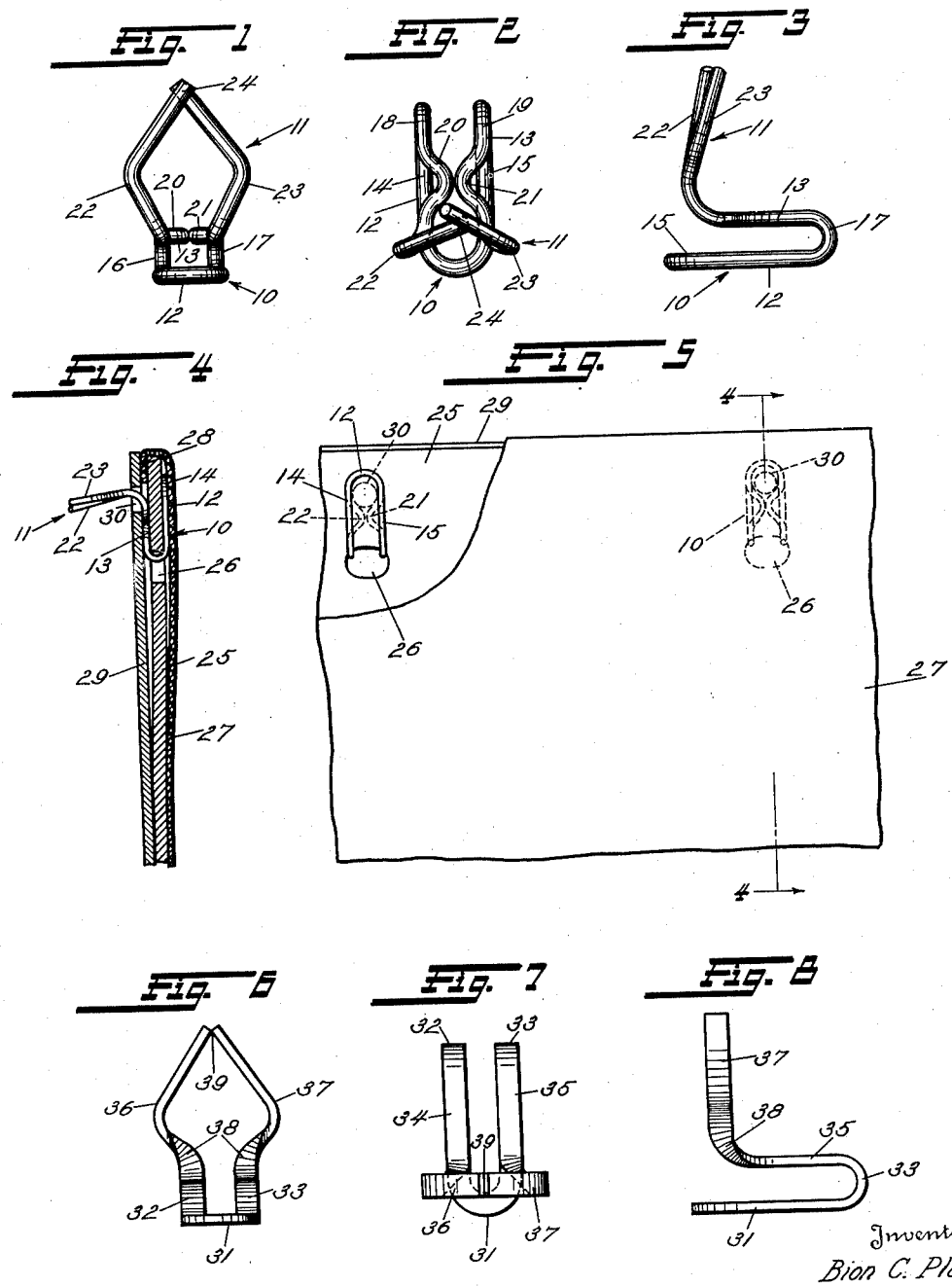

2,136,981

UNITED STATES PATENT OFFICE 2,136,981

FASTENER

Bion C. Place, Detroit, Mich., assignor of one-half to George E. Gagnier, Detroit, Mich.

Application March 21, 1936, Serial No. 70,118

1 Claim. (Cl. 24—215)

The present invention involves a spring stud fastener of a type now widely used in securing trim panels to the interior of automobile or similar bodies. More particularly, the invention is concerned with a spring stud fastener of the kind that includes a head in the form of a hook, which head is formed for engagement with opposite sides of the foundation of the trim panel.

The present invention involves an improvement upon the fastener of application Serial No. 462,633 filed June 30, 1930, now Patent No. 2,057,587 granted October 13, 1936.

In the commercial use of fasteners, such as described in the application just referred to, it was found that under some special circumstances the entering part of the fastener did not provide the desired holding power, because of the fact that the two legs constituting the shank of the fastener, which were carried by the inner arm of the hook-like head, comprised two separated parts. In view of the separation of said parts and in view of the further fact that the legs constituting the shank of the fastener were free to move past each other like the arms of a scissors, said legs were not very firmly supported from lateral movement at either end, the only support for said legs constituting said spaced parts.

A primary object of the present invention is to provide a fastener of the type disclosed in the above referred to application, but which possesses a very substantially increased holding power, even though the fastener be constructed from the same gauge wire as that intended to be used in the construction of the fastener of said application.

Another object of the invention is to provide a spring stud fastener having a head in the form of a hook, which is designed so as to engage the foundation of the panel over a relatively wide area, but in which the legs constituting the shank of the fastener are maintained from substantial movement, either at the end thereof adjacent the head, or at the end thereof that is remote from the head, in order that the holding power of the entering part of the fastener be greatly increased.

Still another object of the invention is to provide a spring stud fastener having a head of hook-like form and also including a shank consisting only of two outwardly bowed legs disposed directly opposite each other with their ends arranged to contact with each other when said shank is sprung in a perforation in a support.

Still further objects of the invention will appear as a description thereof proceeds with reference to the accompanying drawing, in which:

Figures 1, 2 and 3 are respectively end, bottom plan and side views of a preferred form of fastener constructed in accordance with the present invention.

Figure 4 is a sectional view showing the mode of application of the fastener illustrated in Figures 1, 2 and 3, the plane of said section being designated by the line 4—4, Figure 5.

Figure 5 is a fragmentary view showing the fragment of a panel secured by the improved fastener of Figures 1, 2 and 3, a part of the outer covering being broken away to show the engagement of the fastener with the foundation of the panel.

Figures 6, 7 and 8 are respectively end, bottom plan and side views of a modified form of fastener.

Like reference characters indicate like parts throughout the several figures.

The preferred form of fastener is constructed from a single piece of wire by bending said wire into the form illustrated in Figures 1, 2 and 3, and subsequently tempering the fastener to thus give it the desired stiffness and resilience. The fastener, as illustrated in said figures, comprises a head in the form of a hook designated as a whole by the numeral 10, and comprises a shank or entering part designated by 11. The head 10 of the fastener comprises arms 12 and 13. The outer arm 12 is constructed from the mid-portion of the piece of wire by bending it into U-shaped form as illustrated. The straight portions 14 and 15 of the U carry the connecting portions 16 and 17 which carry the parts 18 and 19, which together form the inner arm 13 of the hook-like head. The parts 18 and 19 are provided with corrugations or crimps 20 and 21, at any point along their length, the crests of which are in contact, or closely adjacent each other, as illustrated in Figure 2.

Parts 18 and 19 further carry at their ends the depending outwardly bowed legs 22 and 23 which form the shank or entering part of the fastener, said legs being disposed in planes approximately at right angles to the arms constituting the head 10. In the form of the invention illustrated in Figures 1, 2 and 3, the ends of the legs 22 and 23 overlap as indicated at 24, said legs being free to pass each other like the arms of a scissors when the fastener is sprung in the perforation or socket provided for it.

While the fastener as just described is illustrated as constructed from round wire, it will be understood that it may be constructed from flat wire having a square or rectangular cross-section. Also if desired, one or both arms of the head 10, when constructed of round wire, may be flattened to diminish the thickness of the wire in the head and thus minimize the protrusion of the head of the fastener beyond the surface of the foundation.

The fastener just described is used in the manner illustrated in Figures 4 and 5. Referring to said figures, 25 designates the foundation of an automobile or similar trim panel, such foundation being constructed from relatively heavy cardboard or the like as is customary. The foundation 25 is provided with openings 26 at spaced intervals around the margins thereof. A fabric covering of appropriate finish material 27 covers the exposed face of the foundation, said finish material being lapped around the edges of the foundation as indicated at 28. Such a panel may be conveniently secured to a metallic or like supporting structure 29 having appropriately formed openings 30 provided at the points opposite the fasteners of the trim panels.

In securing the trim panels the fasteners are hooked on the foundation by passing the outer arm 12 through an opening 26 and moving said arm between the fabric 27 and the outside of the foundation 25 until the fastener is firmly hooked on the panel. The panel is provided with a multiplicity of fasteners at spaced intervals around its margins. The panel is then ready for application to the supporting structure, and, in such application, the protruding shanks or entering parts of the fastener are successively sprung into the openings 30 in the support 29 after the manner pointed out in the application above referred to.

It will be observed that inasmuch as the straight portions 14 and 15 of the outer arm of the hook and the parts 18 and 19 of the inner arm of said hook are relatively widely spaced apart, the fastener grips the foundation over a relatively wide area and is supported from said foundation in such manner that it cannot readily be tilted. However, in spite of the fact that the parts 18 and 19 which carry the legs 22 and 23 are widely spaced apart, said legs are maintained from relatively free bodily movement toward each other by contact of the crimps or corrugations 20 and 21. Accordingly, when the legs 22 and 23 are forced through the perforations 30 and the support 29 the contacting crimps or corrugations serve to prevent movement of the end of the legs adjacent the hook-like head of the fastener, the rounded portion of said crimps or corrugations serving to provide a somewhat shifting fulcrum with respect to which the legs 22 and 23 move when the entering part is forced in the perforations in the supporting structure. The resistance to the free movement of the end of the legs adjacent the head of the fastener thus serves to provide a substantial resistance vastly increasing the holding power of the entering part of the fastener as will be readily understood. Fasteners having the requisite holding power can thus be constructed from wire of smaller gauge than would be necessary if the movement of the ends of the legs adjacent the head were not prevented in the manner stated. The cost of fasteners having great holding power is thus greatly reduced.

In the modification of the invention illustrated in Figures 6, 7 and 8, the enhanced holding power of a fastener, constructed from a narrow band of sheet metal, is provided by arranging the two legs constituting the shank of the fastener so that movement of the ends thereof remote from the head of the fastener is prevented and the result, secured by the use of the fastener of Figures 1, 2 and 3, is obtained in an equivalent manner. Referring to the fastener illustrated in Figures 6, 7 and 8, said fastener comprises a hook-like head consisting of a U-shaped outer arm 31, the straight portions of which carry connecting portions 32 and 33 which carry straight parts 34 and 35, which are substantially spaced apart as illustrated in order to engage with the foundation over an area of substantial extent.

The outer arm 31 and the inner arm provided by the parts 34 and 35 produce a hook-like head engaging the foundation over a relatively wide area as in the preferred form of the invention. The legs 36 and 37 constituting the shank of the fastener are carried respectively by the parts 34 and 35, said legs being arranged in a plane approximately normal to the plane of the arms of the head. The narrow band of metal, from which the fastener of this form of the invention is constructed, is twisted at 38 so as to present the major dimension of the band of metal to the wall of the aperture in which the shank is intended to be sprung and to provide a relatively wide point of contact 39 for the ends of the legs 36 and 37 remote from the head.

It will be observed that in the form of the invention of Figures 6, 7 and 8, the legs 36 and 37 are directly opposite each other and contact at 39. Accordingly when the shank is entered in the perforation provided to receive it and contraction thereof occurs, movement of the ends of the legs remote from the head will be prevented by contact of said ends with each other. The stiffness of the entering part of the fastener is thus vastly enhanced though the legs 36 and 37 are carried by parts 34 and 35 that are relatively widely spaced apart.

The fastener is preferably constructed so that the major dimension of the band of metal from which the head of the fastener is constructed extends in a direction parallel to the surfaces of the foundation so that the fastener has a minimum thickness between the fabric covering 27 and the foundation 25 and between the inside of said foundation and the support 29. Inasmuch as the contact of the ends of the legs 36 and 37 at 39 greatly stiffens the shank of the fastener, the latter may be constructed from relatively thin metal without destroying the effectiveness of the holding power of the shank thereof.

The invention may be embodied in other specific forms without departing from the spirit or essential characteristics thereof. The present embodiment is therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by United States Letters Patent is:—

A spring stud fastener constructed from a piece of spring wire comprising a head in the form of a hook including two approximately parallel arms and a connecting portion, said arms being separated to grip the material to be secured by the fastener, the outer arm being U-shaped, the connecting portion consisting of two sections of the wire that are spaced apart and carried by the straight portions of the U of the outer arm, and an inner arm consisting of two parts of the wire carried respectively by said sections, said parts being each provided with a corrugation, said corrugations extending toward each other with their crests in close proximity, and a pair of outwardly-bowed legs constituting the shank of the fastener carrier respectively by said parts, said legs including the ends of said piece of wire and being offset at the end of the shank remote from the head so as to freely pass each other.

BION C. PLACE.